US012625491B2

(12) United States Patent
Xu et al.

(10) Patent No.: US 12,625,491 B2
(45) Date of Patent: May 12, 2026

(54) METHOD AND SYSTEM FOR DIGITAL PLANT SYSTEM MODEL CREATION AND SIMULATION AND STORAGE MEDIUM

(71) Applicant: Siemens Industry Software Inc., Plano, TX (US)

(72) Inventors: Hai Feng Xu, Shanghai (CN); Julu Cao, Shanghai (CN); Karen Shi, Shanghai (CN); Na Li, Chengdu (CN)

(73) Assignee: Siemens Industry Software Inc., Plano, TX (US)

( * ) Notice: Subject to any disclaimer, the term of this patent is extended or adjusted under 35 U.S.C. 154(b) by 320 days.

(21) Appl. No.: 18/559,229

(22) PCT Filed: May 31, 2021

(86) PCT No.: PCT/CN2021/097441
§ 371 (c)(1),
(2) Date: Nov. 6, 2023

(87) PCT Pub. No.: WO2022/252062
PCT Pub. Date: Dec. 8, 2022

(65) Prior Publication Data
US 2024/0241504 A1      Jul. 18, 2024

(51) Int. Cl.
*G05B 19/418*          (2006.01)

(52) U.S. Cl.
CPC .................. *G05B 19/41885* (2013.01); *G05B 2219/37591* (2013.01)

(58) Field of Classification Search
CPC .... G05B 19/41885; G05B 2219/37591; G05B 17/02; G06F 2111/10; G06F 2111/20;
(Continued)

(56) References Cited

U.S. PATENT DOCUMENTS 11,403,541 B2      8/2022   Thomsen et al.
2015/0356209 A1*  12/2015  Han ........................ G06F 30/15
                                                  703/1
(Continued)

FOREIGN PATENT DOCUMENTS

CN          108724190 A      11/2018
CN          109298685 A       2/2019
(Continued)

OTHER PUBLICATIONS

Vjekoslav Damic and John Montgomery, "Mechatronics by Bond Graphs," Chapter 9, "Multibody Dynamics," Jul. 26, 2016, Springer Berlin Heidelberg, pp. 357-448.
(Continued)

*Primary Examiner* — Mong-Shune Chung
(74) *Attorney, Agent, or Firm* — Lempia Summerfield Katz LLC

(57)          ABSTRACT

Embodiments of the present disclosure provide a method and system for digital plant system model creation and simulation and a storage medium. The method includes: receiving a digital model created by a user based on a modeling library: in the modeling library, a digital plant system is divided into multiple subsystems, and motion joints in each subsystem are set with at least one option of at least one solution parameter of dynamics, kinematics and articulation; for each motion joint in the digital model, associating a corresponding algorithm engine in a simulation engine with the motion joint according to a solution parameter of the motion joint; the simulation engine comprises a kinematics algorithm engine, a dynamics algorithm engine and an articulation algorithm engine; using the corresponding algorithm engine to solve the motion joint associated with the algorithm engine. The technical scheme in embodi-
(Continued)

ments of the present disclosure can improve the performance, stability and accuracy of the virtual digital plant.

13 Claims, 7 Drawing Sheets

(58) Field of Classification Search
CPC ...... G06F 2119/14; G06F 30/17; G06F 30/20; B25J 9/1671
See application file for complete search history.

(56) References Cited

U.S. PATENT DOCUMENTS

| | | | | |
|---|---|---|---|---|
| 2017/0003676 | A1* | 1/2017 | Yoshida | G05B 19/4183 |
| 2021/0255611 | A1* | 8/2021 | McGregor | G06T 13/20 |
| 2022/0100917 | A1* | 3/2022 | McGregor | G05B 19/41885 |

FOREIGN PATENT DOCUMENTS

| | | | | |
|---|---|---|---|---|
| CN | 111562769 A | | 8/2020 | |
| CN | 112130534 A | * | 12/2020 | ....... G05B 19/41885 |
| CN | 112199827 A | | 1/2021 | |
| EP | 2110762 A1 | | 10/2009 | |
| JP | 2003178107 A | | 6/2003 | |

OTHER PUBLICATIONS

Stein, Jeffrey et al.,"A Component-Based Modeling Approach for System Design: Theory and Implementation," Proceedings of the 1995 International Conference on Bond Graph Modeling and Simulations, Las Vegas, NV, Jan. 15-18, 1995, pp. 1-7.
Vjekoslav Damic and John Montgomery, "Mechatronics by Bond Graphs," Chapter 2, "Bond Graph Modelling Overview," Jul. 26, 2016, Springer Berlin Heidelberg, pp. 23-76.
International Search Report and Written Opinion for International Application No. PCT/CN2021/097441 mailed Feb. 25, 2022.

* cited by examiner

METHOD AND SYSTEM FOR DIGITAL PLANT SYSTEM MODEL CREATION AND SIMULATION AND STORAGE MEDIUM

This application is a § 371 nationalization of PCT Application Serial No. PCT/CN2021/097441, filed May 31, 2021, designating the United States, which is hereby incorporated by reference in its entirety.

FIELD

The present disclosure relates to industry technologies, and more particularly, to a method and system for digital plant system model creation and simulation and a computer-readable storage medium.

BACKGROUND

Digital twin (DT) is an important technology of Industry 4.0, and digital twin supports the creation and simulation of various digital models, from machine station to assembly or manufacture line, to the whole plant. Physics engine provides approximate simulation for physical systems like gravity, collision detection, rigid body dynamics, friction modeling, etc. The simulation may be intended to model real world physics as closely as possible and has been used in computer games dramatically over the last years. Typically, in an industry automation environment, the system may include large number of machineries, devices and controllers, and it has some concerns in performance, stability and accuracy of using the physics engine to simulate such large-scale robotized machine operations, processes of manufacture or the production line flow. There is no a general physics engine that performs best for any given case, each engine has strengths and weaknesses.

SUMMARY

According to examples of the present disclosure, method and system for digital plant system model creation and simulation and a computer-readable storage medium are provided to improve the performance, stability and accuracy of virtual digital plant.

The method for digital plant system model creation and simulation provided by examples of the present disclosure includes: receiving a digital model created by a user based on a modeling library; in the modeling library, a digital plant system is divided into multiple subsystems, and motion joints in each subsystem are set with at least one option of at least one solution parameter of dynamics, kinematics and articulation; analyzing the digital model to obtain an analytical model with an execution order; wherein analyzing the digital model comprises: for each motion joint in the digital model, associating a corresponding algorithm engine in a simulation engine with the motion joint according to a solution parameter of the motion joint; the simulation engine comprises a kinematics algorithm engine, a dynamics algorithm engine and an articulation algorithm engine; solving the analytical model according to the execution order of the analytical model, and performing simulation according to a solution result; wherein solving the analytical model comprises: using the corresponding algorithm engine to solve the motion joint associated with the algorithm engine.

In an example, in the modeling library, a collision flag option is set for each rigid body that may collide in each subsystem; the simulation engine further includes collision logics of collisions between different rigid bodies; and the collision logics include: kinematics rigid body-dynamics rigid body collision logic, dynamics rigid body-kinematics rigid body collision logic, kinematics rigid body-kinematics rigid body collision logic, and dynamics rigid body-dynamics rigid body collision logic; wherein analyzing the digital model further comprises: for each rigid body with a collision flag, according to a solution parameter of a motion joint connected with the rigid body, associating a corresponding collision logic in the simulation engine with the rigid body, wherein solving the analytical model further comprises: using the corresponding collision logic to solve the rigid body associated with the collision logic.

In an example, wherein analyzing the digital model further includes: checking at least one joint that are connected to the ground; starting from each joint connected to the ground, searching a joint chain to get the information of all joints and all rigid bodies connected with the joints; checking a coupler connected to a joint; checking a motor which drives a joint; checking whether a joint chain is open-loop or closed-loop; adding an actual mass and a moment of inertia to a rigid body connected by dynamic joint and articulated joint; setting the mass and moment of inertia of a rigid body connected by a kinematics joint to 0; removing a collision flag of a rigid body connected by a kinematics joint.

In an example, wherein solving the analytical model according to the execution order of the analytical model, and performing simulation according to a solution result includes: determining each simulation step according to the execution order of the analytical model; using corresponding algorithm engine and/or collision logic to calculate motion and dynamic parameters of all rigid bodies in each joint chain in each simulation step; in each simulation step, according to the motion and dynamic parameters, moving all rigid bodies to a corresponding calculated position, and displaying at least one kind of related information in information of the position, velocity, acceleration, jerk, force, torque and collision signal of all rigid bodies.

In an example, wherein using corresponding algorithm engine and/or collision logic to calculate motion and dynamic parameters of all rigid bodies in each joint chain in each simulation step includes: determining a first simulation step as current simulation step; using a corresponding algorithm engine to calculate current motion and dynamic parameters of a first rigid body, and taking the first rigid body as current rigid body; determining whether the current rigid body is the last rigid body in current joint chain, when the current rigid body is the last rigid body, determining whether the current simulation step is the last simulation step, when the current simulation step is the last simulation step, finishing the calculation; otherwise, taking the next simulation step as the current simulation step and returning to perform the process of using a corresponding algorithm engine to calculate current motion and dynamic parameters of the first rigid body; when the current rigid body is not the last rigid body, taking the next rigid body as current rigid body, and using a corresponding algorithm engine and/or collision logic to calculate current motion and dynamic parameters of the current rigid body according to motion and dynamic parameters of a previous rigid body; and then, returning to perform the process of determining whether the current rigid body is the last rigid body in the joint chain.

In an example, wherein the multiple subsystems include at least one of the following subsystems: a conventional joint subsystem, which comprises: a fixed joint, a hinge joint, a sliding joint, a cylindrical joint, a screw joint, a point on curve joint, a ball joint and a planar joint, and three options of solution parameters of dynamics, kinematics and articulation are set for each joint in the conventional joint subsystem; an open-loop subsystem with one end connected to the ground, which comprises at least one rigid body and at least one joint, and three options of solution parameters of dynamics, kinematics and articulation are set for each joint in the open-loop subsystem; a closed-loop subsystem with two ends connected to the ground, which comprises rigid bodies and joints, and three options of solution parameters of dynamics, kinematics and articulation are set for each joint in the closed-loop subsystem; a point on a curve joint chain subsystem, which comprises: a master rigid body controlled by 1 to 3 point kinematics joints on the curve and at least one slave rigid body following the motion of the master rigid body, and an option of kinematics solution parameter is set for each of the 1 to 3 point kinematics joints on the curve; a coupling transport subsystem, which comprises: a gear, a rack and pinion, a three joint coupler, a pulley and belt, a mechanical cam, and three options of solution parameters of dynamics, kinematics and articulation are set for each joint in the coupling transport subsystem; a driving subsystem, which comprises: position control, speed control, inverse kinematics control, gesture control, and transport surface, and three options of solution parameters of dynamics, kinematics and articulation are set for each joint in the driving subsystem; a hydraulic and pneumatic subsystem, which comprises: force and/or torque control, hydraulic cylinder, hydraulic valve, pneumatic cylinder and pneumatic valve, and an option of dynamic solution parameter is set for each joint in the hydraulic and pneumatic subsystem; a dynamics joint subsystem, which comprises: angular spring joint, linear spring joint, angular limit joint, linear limit joint, breaking constraint and spring damper, and an option of dynamic solution parameter is set for each joint in the dynamics joint subsystem.

The system for digital plant system model creation and simulation provided by examples of the present disclosure includes a modeling library, which comprises modeling modules of motion joints in multiple subsystems of a digital plant system, and the modeling module of each motion joint is set with at least one option of at least one solution parameter of dynamics, kinematics and articulation; a simulation engine, which comprises a kinematics algorithm engine, a dynamics algorithm engine and an articulation algorithm engine; a model analysis module, configured to receive a digital model created by a user based on the modeling library, analyze the digital model, and obtain an analytical model with an execution order; wherein, analyze the digital model comprises: for each motion joint in the digital model, associate a corresponding algorithm engine in the simulation engine with the motion joint according to a solution parameter of the motion joint; and a simulation module, configured to solve the analytical model according to the execution sequence, and perform simulation according to a solution result; wherein solve the analytical model comprises: solve each motion joint using the corresponding algorithm engine associated with the motion joint.

In an example, the modeling library further comprises modeling modules of rigid bodies in subsystems of the digital plant system, and modeling module of each rigid body that may collide is set with an option of collision flag; the simulation engine further comprises collision logics of collisions between different rigid bodies, and the collision logics comprises: kinematics rigid body-dynamics rigid body collision logic, dynamics rigid body-kinematics rigid body collision logic, kinematics rigid body-kinematics rigid body collision logic, and dynamics rigid body-dynamics rigid body collision logic; the model analysis module is further configured to, for each rigid body with collision flag, associate corresponding collision logic in the simulation engine with the rigid body according to a solution parameter of a motion joint connected with the rigid body; the simulation module is further configured to use the corresponding collision logic to solve the rigid body associated with the collision logic.

In an example, the model analysis module is further configured to: check at least one joint that are connected to the ground; starting from each joint connected to the ground, search a joint chain to get the information of all joints and all rigid bodies connected with the joints; check a coupler connected to a joint; check a motor which drives a joint; check whether a joint chain is open-loop or closed-loop; add an actual mass and a moment of inertia to a rigid body connected by dynamic joint and articulated joint; set the mass and moment of inertia of a rigid body connected by a kinematics joint to 0; remove a collision flag of a rigid body connected by a kinematics joint.

In an example, wherein the simulation module determine each simulation step according to the execution order of the analytical model; use corresponding algorithm engine and/ or collision logic to calculate motion and dynamic parameters of all rigid bodies in each joint chain in each simulation step; in each simulation step, according to the motion and dynamic parameters, move all rigid bodies to a corresponding calculated position, and display at least one kind of related information in information of the position, velocity, acceleration, jerk, force, torque and collision signal of all rigid bodies.

In an example, when calculating the motion and dynamic parameters of all rigid bodies in each joint chain in each simulation step, the simulation module determine a first simulation step as current simulation step; use a corresponding algorithm engine to calculate current motion and dynamic parameters of a first rigid body, and taking the first rigid body as current rigid body; determine whether the current rigid body is the last rigid body in current joint chain, when the current rigid body is the last rigid body, determine whether the current simulation step is the last simulation step, when the current simulation step is the last simulation step, finish the calculation; otherwise, take the next simulation step as the current simulation step and return to perform the process of using a corresponding algorithm engine to calculate current motion and dynamic parameters of the first rigid body; when the current rigid body is not the last rigid body, take the next rigid body as current rigid body, and use a corresponding algorithm engine and/or collision logic to calculate current motion and dynamic parameters of the current rigid body according to motion and dynamic parameters of a previous rigid body; and then, return to perform the process of determining whether the current rigid body is the last rigid body in the joint chain.

In an example, wherein the multiple subsystems include at least one of the following subsystems: a conventional joint subsystem, which comprises: a fixed joint, a hinge joint, a sliding joint, a cylindrical joint, a screw joint, a point on curve joint, a ball joint and a planar joint, and three options of solution parameters of dynamics, kinematics and articulation are set for each joint in the conventional joint subsystem; an open-loop subsystem with one end connected to the ground, which comprises at least one rigid body and at least one joint, and three options of solution parameters of dynamics, kinematics and articulation are set for each joint in the open-loop subsystem; a closed-loop subsystem with two ends connected to the ground, which comprises rigid bodies and joints, and three options of solution parameters of dynamics, kinematics and articulation are set for each joint in the closed-loop subsystem; a point on a curve joint chain subsystem, which comprises: a master rigid body controlled by 1 to 3 point kinematics joints on the curve and at least one slave rigid body following the motion of the master rigid body, and an option of kinematics solution parameter is set for each of the 1 to 3 point kinematics joints on the curve; a coupling transport subsystem, which comprises: a gear, a rack and pinion, a three joint coupler, a pulley and belt, a mechanical cam, and three options of solution parameters of dynamics, kinematics and articulation are set for each joint in the coupling transport subsystem; a driving subsystem, which comprises: position control, speed control, inverse kinematics control, gesture control, and transport surface, and three options of solution parameters of dynamics, kinematics and articulation are set for each joint in the driving subsystem; a hydraulic and pneumatic subsystem, which comprises: force and/or torque control, hydraulic cylinder, hydraulic valve, pneumatic cylinder and pneumatic valve, and an option of dynamic solution parameter is set for each joint in the hydraulic and pneumatic subsystem; a dynamics joint subsystem, which comprises: angular spring joint, linear spring joint, angular limit joint, linear limit joint, breaking constraint and spring damper, and an option of dynamic solution parameter is set for each joint in the dynamics joint subsystem.

A system for digital plant system model creation and simulation provided by examples of the present disclosure includes at least one memory, to store a computer program; and at least one processor, to call the computer program stored in the at least one memory to perform the above mentioned method for digital plant system model creation and simulation.

The non-transitory computer-readable storage medium, on which a computer program is stored, the computer program is to be executed by a processor to implement the above mentioned method for digital plant system model creation and simulation.

In embodiments of the invention, it can be seen that the whole digital plant system is divided into multiple subsystems in the modeling library, and at least one of solution parameters of dynamics, kinematics and articulation is set for each motion joint included in each subsystem; and kinematics, dynamics and articulation algorithm engine is set in a simulation engine; after receiving a digital model created by a user based on the modeling library, the corresponding algorithm engine is associated to each joint in the digital model according to a solution parameter of the motion joint. In the simulation, corresponding algorithm engine is used to solve associated motion joints, and the simulation is carried out according to a solution result. It can be seen that embodiments of the present disclosure integrates dynamics, kinematics and articulation into a system, thereby improving the performance, stability and accuracy of the virtual digital plant.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

Figure 1:
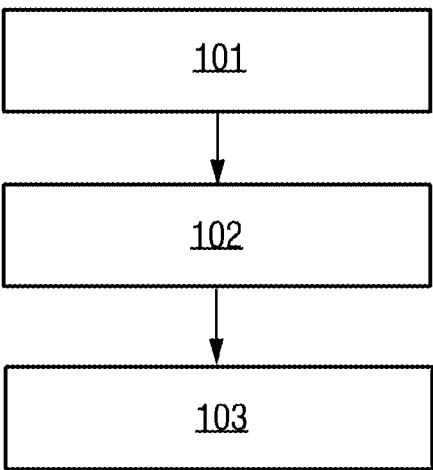
FIG. 1 is a flow diagram illustrating a method for digital plant system model creation and simulation according to embodiments of the present disclosure.

The reference numerals are as follows:

| Reference numeral | Object |
|---|---|
| 101~103 | blocks |
| K1 | kinematics sliding joint |
| D1 | dynamics hinge joint |
| D2 | dynamics sliding joint |
| K2 | kinematics hinge joint |
| 21 | ground |
| 22 | rigid body |
| 23 | joint |
| 24 | master rigid body |
| 25 | slave rigid body |
| r31, r32, r33, r41, r42 | rigid body |
| j31, j32, j33, j41, j42 | joint |
| m31, m32, m33, m41, m42 | motor |
| 501 | modeling library |
| 502 | simulation engine |
| 503 | model analysis module |
| 504 | simulation module |
| 61 | simulation module |
| 62 | processor |
| 63 | displayer |
| 64 | bus |

DETAILED DESCRIPTION

In embodiments of the present disclosure, it is considered that the digital plant system generally includes human(s), robot(s), tool magazine system(s), manufacture unit(s), and transport system(s) etc. In this complex system, some subsystems need to be solved by dynamics, for example, the transport system needs to simulate the force and torque for driver selection; some subsystems need to be solved by kinematics, such as tool magazine system needs precise movement; and for human and robot, articulation is the best choice to solve multi-body dynamics system. At present, some commercial software only supports any one of the three types of dynamics, kinematics and articulation, but the three types cannot be mixed into one system. Therefore, in embodiments of the present disclosure, the whole digital plant system is considered to be subdivided into a plurality of subsystems, and at least one appropriate method of dynamics, kinematics and articulation is adopted for solving different subsystems.

Dynamics refers to the dynamics simulation with force and collision. Kinematics refers to the kinematics simulation without force and collision. Articulation refers to the articulated body dynamics simulation, also known as multi-body dynamics, which is represented as a set of rigid bodies connected through joints in a tree structure. Its primary use case is robotics and other mechanics that need extra accuracy.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

In order to be concise and intuitive in description, the scheme of the present disclosure is described through representative embodiments. A large number of details in the embodiments are only used to help understand the scheme of the present disclosure. However, it is obvious that the implementation of the technical solutions of the present disclosure cannot be limited to these details. In order to avoid unnecessarily blurring the scheme of the present disclosure, some embodiments are not described in detail, but only the framework is given. In the following, "including" means "including but not limited to", "based on . . . " means "at least based on . . . , but not limited to . . . ".

It should be understood that, as used herein, unless the context clearly supports exceptions, the singular forms "a" ("a", "an", "the") are intended to include the plural forms. It should also be understood that, "and/or" used herein is intended to include any and all possible combinations of one or more of the associated listed items.

FIG. 1 is a flow diagram illustrating a method for digital plant system model creation and simulation according to embodiments of the present disclosure. As shown in FIG. 1, the method may include the following processes.

At block 101, a digital model created by a user based on a modeling library is received. In the modeling library, the whole digital plant system is divided into multiple subsystems, and the motion joints included in each subsystem are set with at least one option of supported at least one solution parameter. The at least one solution parameter include at least one of dynamics, kinematics and articulation. That is to say, the modeling library may include modeling modules of motion joints in subsystems of the digital plant system, and the modeling module of each motion joint is set with at least one solution parameter option.

In this embodiment, the whole digital plant system can be divided into multiple subsystems, and at least one option of at least one solution parameter supported by each motion joint included in each subsystem can be set for the motion joint. The at least one solution parameter includes at least one of dynamics, kinematics and articulation.

For example, in one example, the subsystems of the whole plant system can include one or more of the following subsystems: a conventional joint subsystem, an open-loop subsystem with one end connected to the ground, a closed-loop subsystem with two ends connected to the ground, a point on a curve joint chain subsystem, a coupling transport subsystem, a driving subsystem, a hydraulic and pneumatic subsystem, and a dynamics joint subsystem.

The conventional joint subsystem may include: a fixed joint, a hinge joint, a sliding joint, a cylindrical joint, a screw joint, a point on curve joint, a ball joint and a planar joint, etc. the conventional joint subsystem can support three types of solving solutions: dynamics, kinematics and articulation. Accordingly, three options of solution parameters, including dynamics, kinematics and articulation, can be set for each joint in the conventional joint subsystem, so that a user can choose one specific solution parameter needed in a current model for the joint when modeling. It should be noted that when the user selects the kinematics solution parameter for a certain joint, a driving motor should be configured for the joint, otherwise the joint is static.

Figure 2A:
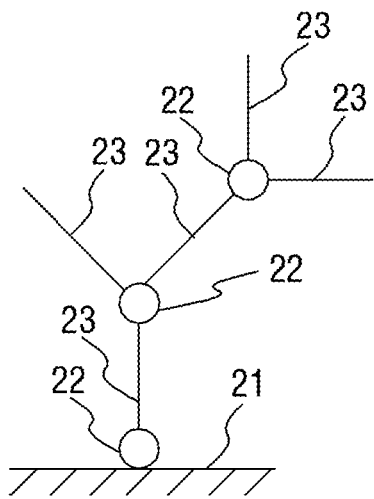
FIG. 2A is a schematic diagram illustrating an open loop subsystem according to an example of the present disclosure.

The open-loop subsystem with one end connected to the ground may include at least one rigid body and at least one joint in the open-loop chain. An open-loop subsystem is shown in FIG. 2A. The straight line 21 with diagonal line represents the ground, and the straight lines 22 without diagonal line represent rigid bodies, and the small circles 23 represents joints. These joints may be joints mixed kinematics, dynamics and articulation. Accordingly, three options of solution parameters, including dynamics, kinematics and articulation, can be set for each joint in the open-loop subsystem, so that a user can choose one specific solution parameter needed in a current model for each joint when modeling.

Figure 2B:
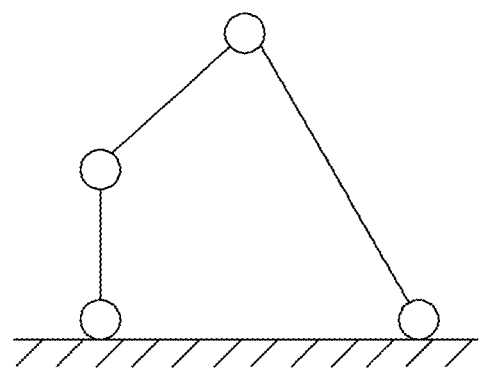
FIG. 2B and FIG. 2C are schematic diagrams illustrating a closed loop subsystem according to an example of the present disclosure respectively.
Figure 2C:
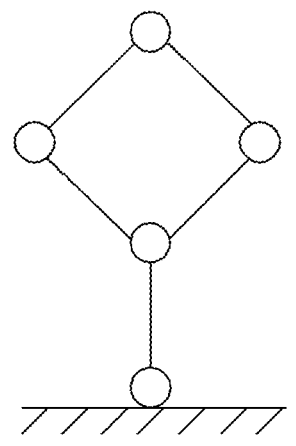

The closed-loop subsystem with two ends connected to the ground may include rigid bodies and joints in the closed loop. FIGS. 2B and 2C show a closed-loop subsystem respectively. The meaning of the symbols in FIGS. 2B and 2C are the same as that in FIG. 2A. These joints may be joints mixed kinematics, dynamics and articulation. Accordingly, three options of solution parameters, including dynamics, kinematics and articulation, can be set for each joint in the closed-loop subsystem, so that a user can choose one specific solution parameter needed in a current model for each joint when modeling.

Figure 2D:
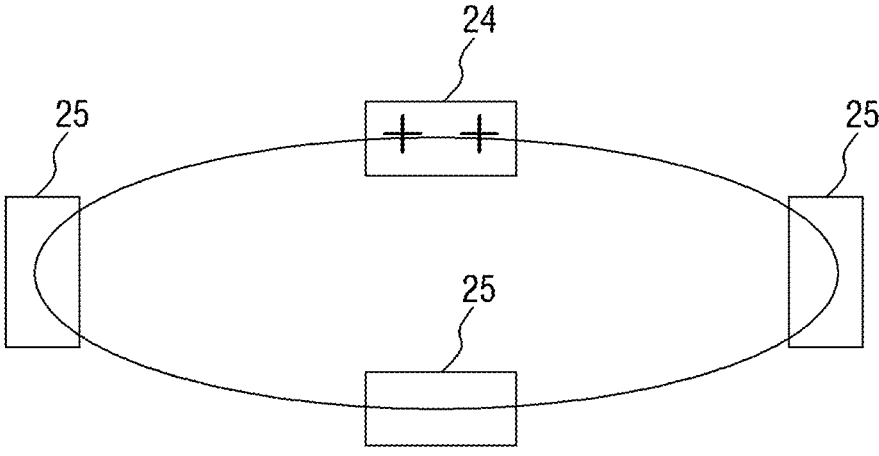
FIG. 2D is a schematic diagram illustrating a point on a curve joint chain subsystem according to an example of the present disclosure.

The point on a curve joint chain subsystem may include: a master rigid body controlled by 1 to 3 point kinematics joints on the curve and at least one slave rigid body following the motion of the master rigid body. FIG. 2D shows a point on a curve joint chain subsystem. The rectangular box 24 with two plus signs represents the master rigid body, and three rectangular boxes 25 without a plus sign represent the slave rigid bodies. The 1 to 3 point kinematics joints on the curve can support kinematics solving solution. Accordingly, an option of kinematics solution parameter can be set for each of the 1 to 3 point kinematics joints on the curve.

The coupling transport subsystem may include: a gear, a rack and pinion, a three joint coupler, a pulley and belt, a mechanical cam, etc. The coupling transport subsystem can link joints mixed dynamics, kinematics and articulation. Accordingly, three options of solution parameters of dynamics, kinematics and articulation can be set for each joint in the coupling transport subsystem, so that a user can choose one specific solution parameter needed in a current model for each joint when modeling.

The driving subsystem may include: position control, speed control, inverse kinematics control, gesture control, and transport surface. The driving subsystem can be added on the dynamics, kinematics and articulation joints. Accordingly, three options of solution parameters of dynamics, kinematics and articulation can be set for each joint in the driving subsystem, so that a user can choose one specific solution parameter needed in a current model for each joint when modeling.

The hydraulic and pneumatic subsystem may include: force and/or torque control, hydraulic cylinder, hydraulic valve, pneumatic cylinder and pneumatic valve, etc. Accordingly, an option of dynamic solution parameter may be set for each joint in the hydraulic and pneumatic subsystem.

The dynamics joint subsystem may include: angular spring joint, linear spring joint, angular limit joint, linear limit joint, breaking constraint and spring damper. The dynamics joint subsystem can support dynamics solving solution. Accordingly, an option of dynamic solution parameter can be set for each joint in the dynamics joint subsystem.

In this embodiment, in the modeling library, a collision flag option is set for each rigid body that may collide in each subsystem, so that a user can load the collision flag when determining it as the collision body during modeling. That is, the modeling library can further include modeling modules of rigid bodies in subsystems of the digital plant system, and an option of collision flag is set for the modeling module of a rigid body that may collide.

When modeling, a user can set a physical body as a rigid body or a collision body (a rigid body that may collide) for simulation. For rigid bodies, a joint and a coupler can be added between the rigid bodies, and a motor can be added to a corresponding joint, and other mechanical constraints can be added to the corresponding rigid bodies. In addition, the solution type supported in current model by each joint, such as kinematics, dynamics or articulation, should be determined. For the collision body, the collision flag can be loaded for the collision body, and an attribute of the collision body, such as kinematics collision body or dynamics collision body, can be determined according to the solution parameter of a motion joint connected to the collision body.

In addition, the modeling library can also include other modeling modules. It is not limited here.

At block 102, the digital model is analyzed to obtain an analytical model with an execution order.

In this embodiment, a kinematics algorithm engine, a dynamics algorithm engine and an articulation algorithm engine may be respectively set in a simulation engine. Wherein the analysis of the digital model may include: for each motion joint in the digital model, a corresponding algorithm engine in the simulation engine is associated with the motion joint according to a solution parameter of the motion joint.

In addition, in this embodiment, collision logics of collisions between different rigid bodies can be further set in the simulation engine, for example, the collision logics may include: kinematics rigid body-dynamics rigid body collision logic, dynamics rigid body-kinematics rigid body collision logic, kinematics rigid body-kinematics rigid body collision logic, and dynamics rigid body-dynamics rigid body collision logic.

Figure 2E:
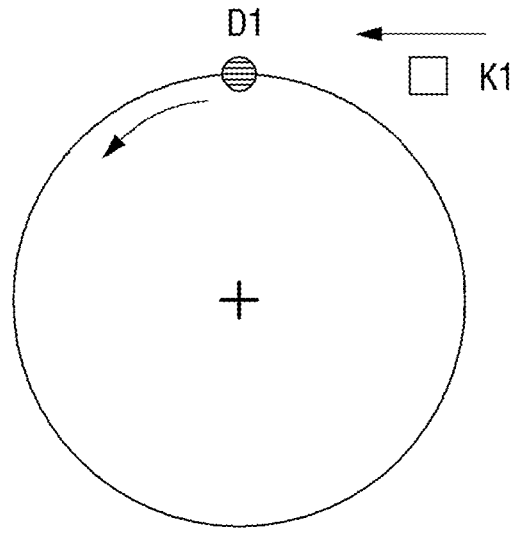
FIG. 2E to FIG. 2H are schematic diagrams illustrating collision between different rigid bodies according to an example of the present disclosure.

As shown in FIG. 2E, the kinematics rigid body-dynamics rigid body collision logic refers to an algorithm logic about the collision of a rigid body controlled by a kinematics joint such as a kinematics sliding joint K1 with a rigid body controlled by a dynamics joint such as a dynamics hinge joint D1. In the collision, a collision force is considered and there is a collision sensor; the kinematics sliding joint K1 is driven by a motor. When the rigid body controlled by the kinematics sliding joint K1 collides with the rigid body controlled by the dynamics hinge joint D1, the rigid body controlled by the dynamics hinge joint D1 moves.

Figure 2F:
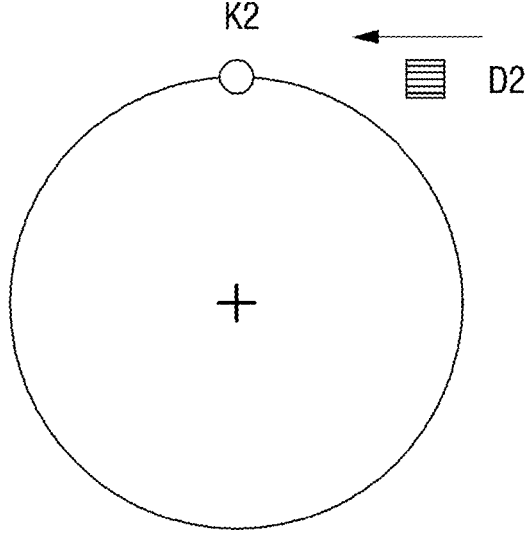

As shown in FIG. 2F, the dynamics rigid body-kinematics rigid body collision logic refers to an algorithm logic about the collision of a rigid body controlled by a dynamics joint such as a dynamics sliding joint D2 with a rigid body controlled by a kinematics joint such as a kinematics hinge joint K2. In the collision, a collision force is not considered and there is a collision sensor; the dynamics sliding joint D2 is driven by a motor. It is difficult for the rigid body controlled by the dynamics sliding joint D2 to pass through the rigid body controlled by the kinematics hinge joint K2. The rigid body controlled by the kinematic hinge joint K2 is fixed.

Figure 2G:
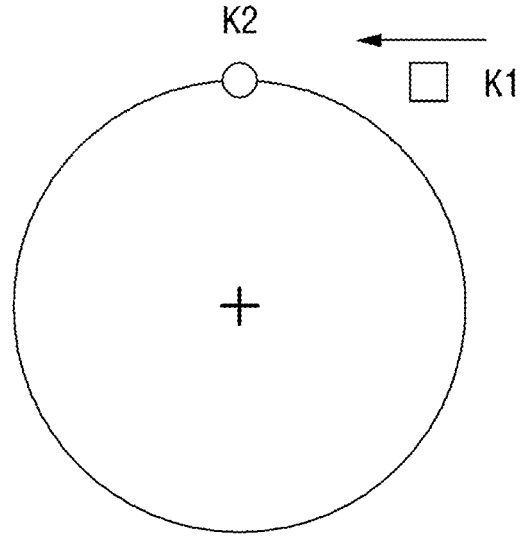

As shown in FIG. 2G, the kinematics rigid body-kinematics rigid body collision logic refers to an algorithm logic about the collision of a rigid body controlled by a kinematics joint such as a kinematics sliding joint K1 with another kinematics joint such as a kinematics hinge joint K2. In the collision, a collision force is not considered and there is no collision sensor; the kinematics sliding joint K1 is driven by a motor, and it is easily for the rigid body controlled by the kinematics sliding joint K1 to pass through the rigid body controlled by the kinematics hinge joint K2, and the rigid body controlled by kinematic hinge joint K2 is fixed.

Figure 2H:
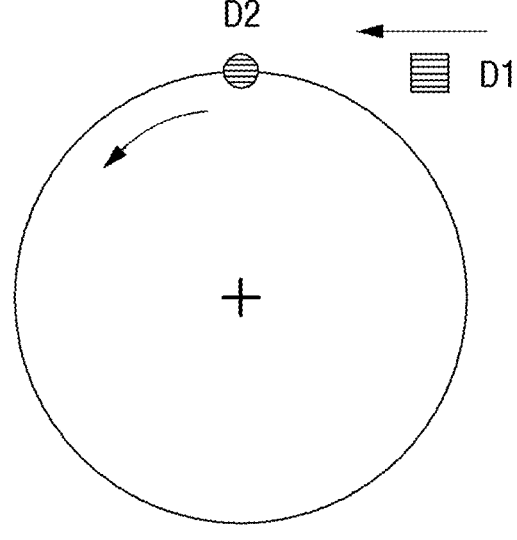

As shown in FIG. 2H, the dynamics rigid body-dynamics rigid body collision logic refers to an algorithm logic about the collision of a rigid body controlled by a dynamics joint such as a dynamics sliding joint D2 with a rigid body controlled by another dynamics joint such as a dynamics hinge joint D1. In the collision, a collision force is considered and there is a collision sensor. The dynamics sliding joint D2 is driven by a motor. When the rigid body controlled by the dynamics sliding joint D2 collides with the rigid body controlled by the dynamics hinge joint D1, the rigid body controlled by the dynamics hinge joint D1 moves. That is, the rigid body controlled by the dynamics hinge joint D1 is driven by the collision.

Correspondingly, the analysis of the digital model may further include: for each rigid body with the collision flag, according to the solution parameter of a motion joint connected with the rigid body, the corresponding collision logic in the simulation engine is associated with the rigid body.

In an example, the block 102 may include specifically the following processes:

1) First, at least one joint that are connected to the ground is checked.

2) Starting from each joint connected to the ground, a joint chain is searched to get the information of all joints and all rigid bodies connected with the joints.

3) A coupler which may be connected to a joint is checked.

4) A motor which may drive a joint is checked.

5) Whether the joint chain is open-loop or closed-loop is checked. In the simulation engine, the constraint equations for open-loop and closed-loop are different. The open-loop only needs to calculate the constraints at one end, while the closed-loop needs to calculate the constraints at both ends. Accordingly, the final position of the rigid body will be different.

6) Checked at least one rigid body, at least one joint, zero or at least one coupler, and zero or at least one motor are added to the simulation engine.

This process 6) may specifically include:

6.1) The actual mass and moment of inertia are added to a rigid body connected by dynamic joint and articulated joint.

6.2) The mass and moment of inertia of a rigid body connected by a kinematics joint are set to 0.

6.3) The collision flag of a rigid body connected by a kinematics joint is removed.

6.4) According to the solution parameter of each motion joint, a corresponding algorithm engine in the simulation engine is associated with each motion joint.

6.5) For the rigid body with collision flag, corresponding collision logic in the simulation engine is associated with the rigid body according to the solution parameter of the motion joint connected to the rigid body.

At block 103, the analytical model is solved according to the execution order of the analytical model, and simulation is performed according to a solution result.

In this embodiment, for each motion joint associated with an algorithm engine, the corresponding algorithm engine can be used to solve the associated motion joint, so as to obtain the motion and dynamic parameters such as position, velocity, acceleration, jerk, force and torque of the connected rigid body. In addition, for each rigid body associated with collision logic, the corresponding collision logic can be used to solve the associated rigid body to obtain force, collision signal and motion parameters of the collision rigid body.

In an example, the block 103 may specifically include: each simulation step is determined according to the execution order of the analytical model. The corresponding algorithm engine and/or collision logic are used to calculate the motion and dynamic parameters of all rigid bodies in the joint chain in each simulation step. In each simulation step, according to the motion and dynamic parameters, all rigid bodies are moved to a corresponding calculated position, and at least one kind of related information in information of the position, velocity, acceleration, jerk, force, torque and collision signal of all rigid bodies are displayed.

The calculation of motion and dynamic parameters of all rigid bodies in the joint chain in each simulation step can include the following processes:

In step A, the first simulation step is determined as the current simulation step.

In step B, a corresponding algorithm engine is used to calculate current motion and dynamic parameters of a first rigid body, and the first rigid body is taken as current rigid body.

In this step, the position information in motion and dynamic parameters can be calculated as follows: current position of current rigid body=previous position of current rigid body+incremental position of current rigid body.

Through iterative calculation, a set of equations is created for all constraints (joints, couplers, motors, etc. with dynamics or articulation or kinematics) to obtain the incremental position of the current rigid body in this simulation step.

In step C, whether the current rigid body is the last rigid body in the joint chain is determined, when the current rigid body is not the last rigid body, step D will be performed; otherwise, step E will be performed.

In step D, the next rigid body is taken as current rigid body, and a corresponding algorithm engine and/or collision logic is used to calculate current motion and dynamic parameters of the current rigid body according to motion and dynamic parameters of the previous rigid body, and then, return to step C.

In this step, the position information in motion and dynamic parameters can be calculated in different scenes. For example, in a non-collision scene, current position of the current rigid body=previous position of the current rigid body+incremental position of the previous rigid body+incremental position of the current rigid body. For another example, in a collision scene, current position of the current rigid body=previous position of the current rigid body+ incremental position of the current rigid body determined according to incremental position of the previous rigid body.

Through iterative calculation, a set of equations is created for all constraints (joints, couplers, motors, etc. with dynamics or articulation or kinematics) to obtain the incremental position of the current rigid body in this simulation step.

In step E, whether the current simulation step is the last simulation step is determined, when the current simulation step is the last simulation step, the calculation is finished; otherwise, the next simulation step is taken as the current simulation step and return to step A.

Figure 3:
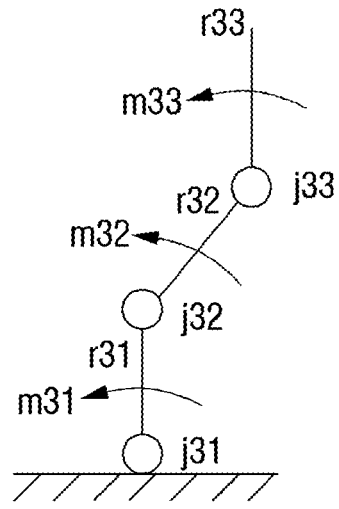
FIG. 3 is a schematic diagram illustrating a digital model according to an example of the present disclosure.

For example:

FIG. 3 is a schematic diagram illustrating a digital model according to an example of the present disclosure. As shown in FIG. 3, the digital model includes: the first rigid body r31, the second rigid body r32, the third rigid body r33, the dynamics joint j31, the articulation joint j32, the kinematics joint j33, the first driving motor m31 driving the dynamics joint j31, the second driving motor m32 driving the articulation joint j32 and the third driving motor m33 driving the kinematics joint j33. One end of the first rigid body r31 is connected with the ground through the dynamics joint j31, the other end is connected with one end of the second rigid body r32 through the articulation joint j32, the other end of the second rigid body r32 is connected with one end of the third rigid body r33 through the kinematics joint j33, and the other end of the third rigid body r33 is a free end.

In the digital model shown in FIG. 3, there is a joint chain connected to the ground. For the digital model shown in FIG. 3, the process of calculating the position of each rigid body in the joint chain can include:

Firstly, each joint in the joint chain is traversed from the ground to obtain the information of the dynamics joint j31 and the first rigid body r31. Therefore, the incremental position of the first rigid body r31 can be calculated by using the dynamics equations, so that the current position of the first rigid body r31 is: the previous position of the first rigid body r31+the incremental position of the first rigid body r31.

Secondly, the information of the articulation joint j32 and the second rigid body r32 is obtained, so the incremental position of the second rigid body r32 can be calculated by using the articulation equations, so that the current position of the second rigid body r32 is: the previous position of the second rigid body r32+the incremental position of the first rigid body r31+the incremental position of the second rigid body r32.

Finally, the information of the kinematics joint j33 and the third rigid body r33 is obtained, so the incremental position of the third rigid body r33 can be calculated by using the kinematics equations, and the current position of the third rigid body r33 is: the previous position of the third rigid body r33+the incremental position of the second rigid body r32+the incremental position of the third rigid body r33.

Figure 4:
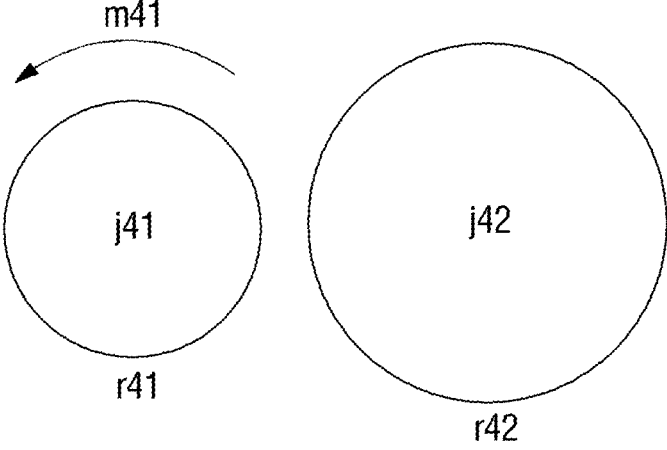
FIG. 4 is a schematic diagram illustrating a digital model according to another example of the present disclosure.

FIG. 4 is a schematic diagram illustrating a digital model according to another example of the present disclosure. As shown in FIG. 4, the digital model includes: the first rigid body r41 and the second rigid body r42, the dynamic joint j41, the kinematic joint j42 and the motor m41 driving the dynamic joint j41.

In the digital model shown in FIG. 4, the ground is connected with two joint chains, and the first rigid body r41 and the second rigid body r42 are meshed by gears. For the digital model shown in FIG. 4, the process of calculating the position of each rigid body in the joint chains can include:

Firstly, the first joint chain is traversed. The information of the dynamics joint j41 and the first rigid body r41 is obtained, so the incremental position of the first rigid body r41 can be calculated by using the dynamics equations, so that the current position of the first rigid body r41 is: the previous position of the first rigid body r41+the incremental position of the first rigid body r41.

Then, the second joint chain is traversed. Therefore, the incremental position of the second rigid body r42 is: incremental position of the first rigid body r41*transport ratio, and the current position of the second rigid body r42 is: the previous position of the second rigid body r42+incremental position of the second rigid body r42.

The above described the method for digital plant system model creation and simulation in the embodiment of the present disclosure in detail, and the following will describe the system for digital plant system model creation and simulation in embodiments of the present disclosure in detail. The system for digital plant system model creation and simulation in embodiments of the present disclosure can be used to implement the method for digital plant system model creation and simulation in embodiments of the present disclosure. For details not disclosed in detail in system embodiments of the present disclosure, please refer to the corresponding description in method embodiments of the present disclosure, which will not be repeated hereinafter.

Figure 5:
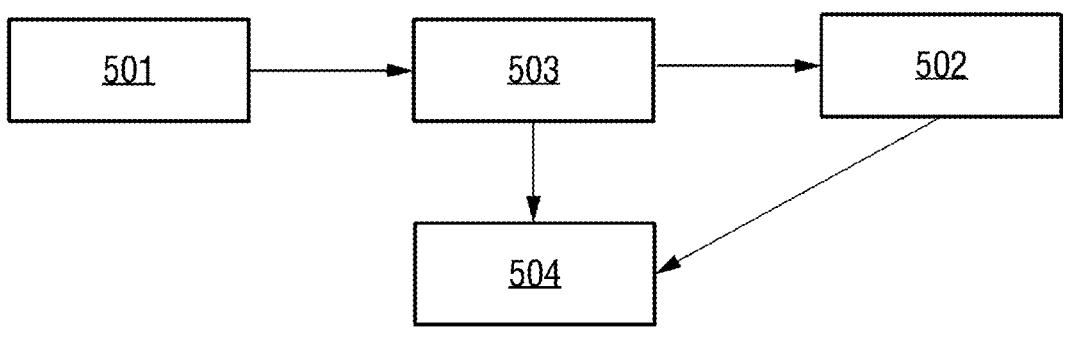
FIG. 5 is schematic diagram illustrating a system for digital plant system model creation and simulation according to embodiments of the present disclosure.

FIG. 5 is schematic diagram illustrating a system for digital plant system model creation and simulation according to embodiments of the present disclosure. As shown in FIG. 5, the system may include: a modeling library 501, a simulation engine 502, a model analysis module 503 and a simulation module 504.

The modeling library 501 includes modeling modules of motion joints in multiple subsystems of the digital plant system, and the modeling module of each motion joint is set with at least one option of at least one solution parameter; The at least one solution parameter include at least one of the solution parameters of dynamics, kinematics and articulation. In addition, the modeling library 501 further includes modeling modules for rigid bodies in subsystems of the digital plant system, and the modeling module of the rigid body that may collide can be set with an option of collision flag. Of course, the modeling library 501 may also include other modeling modules required for modeling. It is not limited here.

The simulation engine 502 includes a kinematics algorithm engine, a dynamics algorithm engine and an articulation algorithm engine. In addition, the collision logics of collisions between different rigid bodies can be further set in the simulation engine 502, and the collision logics includes: kinematics rigid body-dynamics rigid body collision logic, dynamics rigid body-kinematics rigid body collision logic, kinematics rigid body-kinematics rigid body collision logic, and dynamics rigid body-dynamics rigid body collision logic.

The model analysis module 503 is configured to receive a digital model created by a user based on the modeling library 501, analyze the digital model, and obtain an analytical model with a certain execution order. Wherein, the analysis of the digital model includes: for each motion joint in the digital model, a corresponding algorithm engine in the simulation engine 502 is associated with the motion joint according to a solution parameter of the motion joint. In addition, for each rigid body with collision flag, the model analysis module 503 may also associate corresponding collision logic in the simulation engine 502 with the rigid body according to a solution parameter of a motion joint connected with the rigid body.

The simulation module 504 is configured to solve the analytical model according to the execution sequence in the analytical model, and to simulate according to a solution result. The solution of the analytical model includes: each associated motion joint is solved by using the corresponding algorithm engine. In addition, the simulation module 504 can also solve each associated rigid body by using the corresponding collision logic.

Corresponding to the method described in FIG. 1, when the model analysis module 503 analyzes the digital model, it can specifically include:

First, check at least one joint that are connected to the ground;

Starting from each joint connected to the ground, search a joint chain to get the information of all joints and all rigid bodies connected with the joints;

Check a coupler which may be connected to a joint;

Check a motor which may drive a joint;

Check whether the joint chain is open-loop or closed-loop;

Add checked at least one rigid body, at least one joint, zero or at least one coupler, and zero or at least one motor to the simulation engine.

Corresponding to the method described in FIG. 1, when the model analysis module 503 adds the at least one rigid body, at least one joint, zero or at least one coupler, and zero or at least one motor to the simulation engine, it may include:

Add the actual mass and moment of inertia to a rigid body connected by dynamic joint and articulated joint.

Set the mass and moment of inertia of a rigid body connected by a kinematics joint to 0;

Remove the collision flag of a rigid body connected by a kinematics joint;

According to the solution parameter of each motion joint, associate a corresponding algorithm engine in the simulation engine with each motion joint;

For the rigid body with collision flag, associate corresponding collision logic in the simulation engine with the rigid body according to a solution parameter of a motion joint connected to the rigid body.

Corresponding to the method described in FIG. 1, the simulation module 504 may determine each simulation step according to the execution order of the analytical model, and use corresponding algorithm engine and/or collision logic to calculate motion and dynamic parameters of all rigid bodies in each joint chain in each simulation step. In each simulation step, according to the motion and dynamic parameters, move all rigid bodies to a corresponding calculated position, and display at least one kind of related information in information of the position, velocity, acceleration, jerk, force, torque and collision signal of all rigid bodies.

When calculating the motion and dynamic parameters of all rigid bodies in each joint chain in each simulation step, the simulation module 504 may:

Determine the first simulation step as the current simulation step.

Use a corresponding algorithm engine to calculate current motion and dynamic parameters of a first rigid body, for example, the position information in motion and dynamic parameters may be calculated as follows: current position of the first rigid body=previous position of the first rigid body+incremental position of the first rigid body, and take the first rigid body as current rigid body.

Determine whether the current rigid body is the last rigid body in the joint chain, when the current rigid body is the last rigid body, determine whether the current simulation step is the last simulation step, when the current simulation step is the last simulation step, the calculation is finished;

otherwise, take the next simulation step as the current simulation step and return to perform the process of using a corresponding algorithm engine to calculate current motion and dynamic parameters of a first rigid body.

When the current rigid body is not the last rigid body, take the next rigid body as current rigid body, and use a corresponding algorithm engine and/or collision logic to calculate current motion and dynamic parameters of the current rigid body according to motion and dynamic parameters of the previous rigid body. For example, the position information in motion and dynamic parameters can be calculated in different scenes. In a non-collision scene, current position of the current rigid body=previous position of the current rigid body+incremental position of the previous rigid body+ incremental position of the current rigid body. In a collision scene, current position of the current rigid body=previous position of the current rigid body+incremental position of the current rigid body determined according to incremental position of the previous rigid body. And then, return to perform the process of determining whether the current rigid body is the last rigid body in the joint chain.

Corresponding to the method described in FIG. 1, the multiple subsystems include at least one of the following subsystems.

A conventional joint subsystem, which may include: a fixed joint, a hinge joint, a sliding joint, a cylindrical joint, a screw joint, a point on curve joint, a ball joint and a planar joint, etc., and three options of solution parameters, including dynamics, kinematics and articulation, are set for each joint in the conventional joint subsystem.

An open-loop subsystem with one end connected to the ground, which may include at least one rigid body and at least one joint in the open-loop chain, and three options of solution parameters, including dynamics, kinematics and articulation, are set for each joint in the open-loop subsystem.

A closed-loop subsystem with two ends connected to the ground, which may include rigid bodies and joints in the closed loop, and three options of solution parameters, including dynamics, kinematics and articulation, are set for each joint in the closed-loop subsystem.

A point on a curve joint chain subsystem, which may include: a master rigid body controlled by 1 to 3 point kinematics joints on the curve and at least one slave rigid body following the motion of the master rigid body, and an option of kinematics solution parameter is set for each of the 1 to 3 point kinematics joints on the curve.

A coupling transport subsystem, which may include: a gear, a rack and pinion, a three joint coupler, a pulley and belt, a mechanical cam, etc., and three options of solution parameters of dynamics, kinematics and articulation are set for each joint in the coupling transport subsystem.

A driving subsystem, which may include: position control, speed control, inverse kinematics control, gesture control, and transport surface, and three options of solution parameters of dynamics, kinematics and articulation are set for each joint in the driving subsystem.

A hydraulic and pneumatic subsystem, which may include: force and/or torque control, hydraulic cylinder, hydraulic valve, pneumatic cylinder and pneumatic valve, etc., and an option of dynamic solution parameter is set for each joint in the hydraulic and pneumatic subsystem.

A dynamics joint subsystem, which may include: angular spring joint, linear spring joint, angular limit joint, linear limit joint, breaking constraint and spring damper, and an option of dynamic solution parameter is set for each joint in the dynamics joint subsystem.

Figure 6:
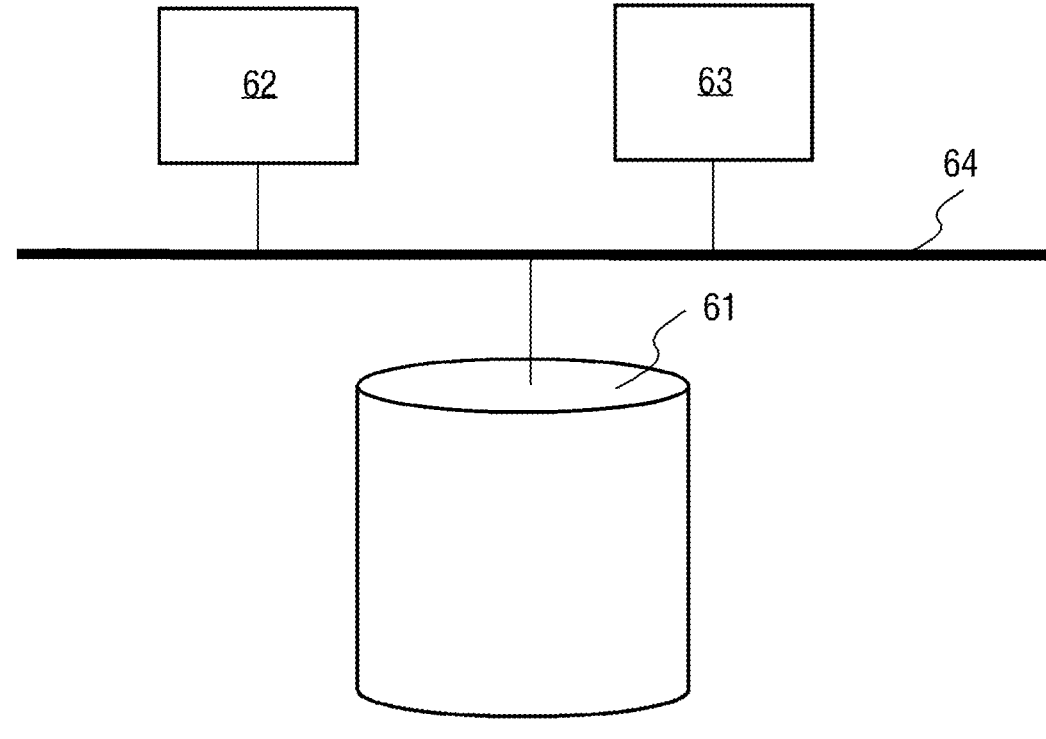
FIG. 6 is a schematic diagram illustrating another system for digital plant system model creation and simulation according to embodiments of the present disclosure.

FIG. 6 is a schematic diagram illustrating another system for digital plant system model creation and simulation according to embodiments of the present disclosure. The system may be used to perform the method shown in FIG. 1, or to implement the system in FIG. 5. As shown in FIG. 6, the system may include at least one memory 61, at least one processor 62 and at least one displayer 63. In addition, some other components may be included, such as communication port, input/output controller, network communication interface, etc. These components communicate through bus 64, etc.

At least one memory 61 is configured to store a computer program. In addition, at least one memory 61 may store an operating system or the like. Operating systems include but are not limited to: Android operating system, Symbian operating system, windows operating system, Linux operating system, etc.

At least one processor 62 is configured to call the computer program stored in at least one memory 61 to perform the method for digital plant system model creation and simulation described in embodiments of the present disclosure. The processor 62 can be CPU, processing unit/module, ASIC, logic module or programmable gate array, etc. It can receive and send data through the communication port.

At least one display 63 is configured to display simulation process, human-computer interaction information, etc.

It should be noted that not all the steps and modules in the above mentioned processes and structural diagrams are necessary, and some steps or modules can be ignored according to the actual needs. The execution sequence of each step is not fixed, and can be adjusted as required. The division of each module is only to describe the functional division adopted. When it is actually implemented, a module can be realized by multiple modules, and the functions of multiple modules can also be realized by the same module. These modules can be located in the same device or in different devices.

In fact, the system for digital plant system model creation and simulation provided by embodiments of the present disclosure may be specifically implemented in various manners. For example, the system may be a Programmable logic controller (PLC), or may be compiled, by using an application programming interface that complies with a certain regulation, as a plug-in that is installed in an intelligent terminal, or may be encapsulated into an application program for a user to download and use. For example, the system can be integrated into CAE software as a plug-in, such as NX (Siemens).

When compiled as a plug-in, the system may be implemented in various plug-in forms such as ocx, dll, and cab. The system provided by this implementation manner of the present disclosure may also be implemented by using a specific technology, such as a Flash plug-in technology, a RealPlayer plug-in technology, an MMS plug-in technology, a MIDI staff plug-in technology, or an ActiveX plug-in technology.

The method for digital plant system model creation and simulation provided by embodiments of the present disclosure may be stored in various storage mediums in an instruction storage manner or an instruction set storage manner. In addition, a computer-readable storage medium is provided in embodiments of the invention, on which a computer program is stored, and the computer program can be executed by a processor and a method for digital plant system model creation and simulation described in embodiments of the invention is realized. Specifically, a system or device with a storage medium may be provided to store software program codes on the storage medium to realize the functions of any of the embodiments described above, and to make the computer (or CPU or MPU) of the system or device read out and execute the program code stored in the storage medium. In addition, some or all of the actual operations can be completed by the instruction based on program code to make the operating system operated on the computer, etc. The program code read from the storage medium can also be written to the memory set in the expansion board in the computer or set in the expansion unit connected with the computer. Then, the CPU installed on the expansion board or expansion unit can be performed in part and all the actual operations by the instruction based on the program code. Thus, the function of any of the above embodiments is realized. The storage medium embodiments for provider code include floppy disk, hard disk, magnetic disc, CD-ROM (such as CD-ROM, CD-R, CD-RW, DVD-ROM, DVD-RAM, DVD-RW, dvd+rw), tape, non-volatile memory card and ROM. Optionally, program code can be downloaded from the server computer by the communication network.

It can be seen from the above scheme that, in embodiments of the invention, the whole digital plant system is divided into multiple subsystems in the modeling library, and at least one of solution parameters of dynamics, kinematics and articulation is set for each motion joint included in each subsystem; and kinematics, dynamics and articulation algorithm engine is set in a simulation engine; after receiving a digital model created by a user based on the modeling library, the corresponding algorithm engine is associated to each joint in the digital model according to a solution parameter of the motion joint. In the simulation, corresponding algorithm engine is used to solve associated motion joints, and the simulation is carried out according to a solution result. It can be seen that embodiments of the present disclosure integrates dynamics, kinematics and articulation into a system, thereby improving the performance, stability and accuracy of the virtual digital plant.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A method for digital plant system model creation and simulation, the method comprising:

receiving a digital model created by a user based on a modeling library, wherein, in the modeling library, a digital plant system is divided into multiple subsystems, and motion joints in each subsystem of the multiple subsystems are set with at least one option of at least one solution parameter of dynamics, kinematics, and articulation;

analyzing the digital model to obtain an analytical model with an execution order, wherein the analyzing of the digital model comprises, for each motion joint in the digital model, associating a corresponding algorithm engine in a simulation engine with the respective motion joint according to a solution parameter of the respective motion joint, and wherein the simulation engine comprises a kinematics algorithm engine, a dynamics algorithm engine, and an articulation algorithm engine; and solving the analytical model according to the execution order of the analytical model and performing a simulation according to a solution result, wherein the solving of the analytical model comprises using the corresponding algorithm engine to solve the respective motion joint associated with the corresponding algorithm engine.

2. The method of claim 1, wherein, in the modeling library, a collision flag option is set for each rigid body configured to collide in each subsystem, wherein the simulation engine further comprises collision logics of collisions between different rigid bodies, wherein the collision logics include kinematics rigid body-dynamics rigid body collision logic, dynamics rigid body-kinematics rigid body collision logic, kinematics rigid body-kinematics rigid body collision logic, and dynamics rigid body-dynamics rigid body collision logic, wherein the analyzing of the digital model further comprises, for each rigid body with a collision flag, according to a solution parameter of a motion joint connected with the rigid body, associating a corresponding collision logic in the simulation engine with the rigid body, and wherein the solving of the analytical model further comprises using the corresponding collision logic to solve the rigid body associated with the corresponding collision logic.

3. The method of claim 1, wherein the analyzing of the digital model further comprises:

identifying at least one joint of the motion joins that is connected to a ground;

starting from each joint of the at least one joint connected to the ground, searching a joint chain to get information of all joints of the motion joins and all rigid bodies connected with the motion joints;

checking a coupler connected to a motion joint;

checking a motor which drives a motion joint;

checking whether a joint chain is open-loop or closed-loop;

adding an actual mass and a moment of inertia to a rigid body connected by a dynamic joint and an articulated joint;

setting the actual mass and the moment of inertia of a rigid body connected by a kinematics joint to O; and removing a collision flag of a rigid body connected by a kinematics joint.

4. The method of claim 3, wherein the solving of the analytical model and the performing of the simulation comprises:

determining each simulation step according to the execution order of the analytical model;

using the corresponding algorithm engine and/or the corresponding collision logic to calculate motion and dynamic parameters of all rigid bodies in each joint chain in each simulation step; and moving, in each simulation step, according to the motion and dynamic parameters, all rigid bodies to a corresponding calculated position, and displaying at least one kind of related information in information of the corresponding calculated position, velocity, acceleration, jerk, force, torque, and collision signal of all rigid bodies.

5. The method of claim 4, wherein the using of the corresponding algorithm engine and/or the corresponding collision logic comprises:

determining a first simulation step as current simulation step;

using the corresponding algorithm engine to calculate current motion and dynamic parameters of a first rigid body, and taking the first rigid body as a current rigid body;

determining whether the current rigid body is a last rigid body in a current joint chain;

determining whether the current simulation step is a last simulation step when the current rigid body is the last rigid body, and finishing a calculation when the current simulation step is the last simulation step, or taking a next simulation step as the current simulation step and returning to perform the using of the corresponding algorithm engine to calculate current motion and dynamic parameters of the first rigid body when the current simulation step is not the last simulation step; and taking a next rigid body as the current rigid body when the current rigid body is not the last rigid body, using the corresponding algorithm engine and/or the corresponding collision logic to calculate current motion and dynamic parameters of the current rigid body according to motion and dynamic parameters of a previous rigid body, and then returning to perform the determining whether the current rigid body is the last rigid body in the joint chain.

6. The method of claim 1, wherein the multiple subsystems comprise at least one subsystem of the following subsystems:

a conventional joint subsystem comprising a fixed joint, a hinge joint, a sliding joint, a cylindrical joint, a screw joint, a point on curve joint, a ball joint, and a planar joint, wherein three options of solution parameters of dynamics, kinematics, and articulation are set for each joint in the conventional joint subsystem;

an open-loop subsystem with one end connected to a ground, which comprises at least one rigid body and at least one joint, and three options of solution parameters of dynamics, kinematics, and articulation are set for each joint of the at least one joint in the open-loop subsystem;

a closed-loop subsystem with two ends connected to the ground, which comprises rigid bodies and joints, and three options of solution parameters of dynamics, kinematics, and articulation are set for each joint of the joints in the closed-loop subsystem;

a point on a curve joint chain subsystem comprising a master rigid body controlled by 1 to 3 point kinematics joints on the curve and at least one slave rigid body following the motion of the master rigid body, wherein an option of kinematics solution parameter is set for each kinematics joint of the 1 to 3 point kinematics joints on the curve;

a coupling transport subsystem, which comprises: comprising a gear, a rack and pinion, a three joint coupler, a pulley and belt, and a mechanical cam, wherein three options of solution parameters of dynamics, kinematics, and articulation are set for each joint in the coupling transport subsystem;

a driving subsystem comprising position control, speed control, inverse kinematics control, gesture control, and transport surface, wherein three options of solution parameters of dynamics, kinematics, and articulation are set for each joint in the driving subsystem;

a hydraulic and pneumatic subsystem comprising force and/or torque control, hydraulic cylinder, hydraulic valve, pneumatic cylinder, and pneumatic valve, wherein an option of dynamic solution parameter is set for each joint in the hydraulic and pneumatic subsystem; and a dynamics joint subsystem comprising an angular spring joint, linear spring joint, angular limit joint, linear limit joint, breaking constraint, and spring damper, wherein an option of dynamic solution parameter is set for each joint in the dynamics joint subsystem.

7. A system for digital plant system model creation and simulation, the system comprising:

a modeling library comprising modeling modules of motion joints in multiple subsystems of a digital plant system, wherein a modeling module of each motion joint is set with at least one option of at least one solution parameter of dynamics, kinematics, and articulation;

a simulation engine comprising a kinematics algorithm engine, a dynamics algorithm engine, and an articulation algorithm engine;

a model analysis module configured to receive a digital model created by a user based on the modeling library, analyze the digital model, and obtain an analytical model with an execution order, wherein the analyzing of the digital model comprises, for each motion joint in the digital model, associating a corresponding algorithm engine in the simulation engine with the respective motion joint according to a solution parameter of the respective motion joint; and a simulation module configured to solve the analytical model according to an execution sequence and perform a simulation according to a solution result, wherein the solving of the analytical model comprises solving each motion joint using the corresponding algorithm engine associated with the respective motion joint.

8. The system of claim 7, wherein the modeling library further comprises modeling modules of rigid bodies in subsystems of the digital plant system, and a modeling module of each rigid body that is configured to collide is set with an option of a collision flag, wherein the simulation engine further comprises collision logics of collisions between different rigid bodies, wherein the collision logics comprise kinematics rigid body-dynamics rigid body collision logic, dynamics rigid body-kinematics rigid body collision logic, kinematics rigid body-kinematics rigid body collision logic, and dynamics rigid body-dynamics rigid body collision logic, wherein the model analysis module is further configured to, for each rigid body with a respective collision flag, associate corresponding collision logic in the simulation engine with the respective rigid body according to a solution parameter of a motion joint connected with the respective rigid body, and wherein the simulation module is further configured to use the corresponding collision logic to solve the respective rigid body associated with the collision logic.

9. The system of claim 7, wherein the model analysis module is further configured to:

identify at least one joint of the motion joins that is connected to a ground;

starting from each joint of the at least one joint connected to the ground, search a joint chain to get information of all joints of the motion joins and all rigid bodies connected with the motion joints;

check a coupler connected to a motion joint;

check a motor which drives a motion joint;

check whether a joint chain is open-loop or closed-loop;

add an actual mass and a moment of inertia to a rigid body connected by dynamic joint and an articulated joint;

set the actual mass and the moment of inertia of a rigid body connected by a kinematics joint to O; and remove a collision flag of a rigid body connected by a kinematics joint.

10. The system of claim 9, wherein the simulation module is further configured to:

determine each simulation step according to the execution order of the analytical model;

use the corresponding algorithm engine and/or the corresponding collision logic to calculate motion and dynamic parameters of all rigid bodies in each joint chain in each simulation step; and move, in each simulation step, according to the motion and dynamic parameters, all rigid bodies to a corresponding calculated position, and display at least one kind of related information in information of the corresponding calculated position, velocity, acceleration, jerk, force, torque, and collision signal of all rigid bodies.

11. The system of claim 10, wherein, when calculating the motion and dynamic parameters of all rigid bodies in each joint chain in each simulation step, the simulation module is configured to:

determine a first simulation step as current simulation step;

use the corresponding algorithm engine to calculate current motion and dynamic parameters of a first rigid body, and take the first rigid body as a current rigid body;

determine whether the current rigid body is a last rigid body in a current joint chain;

determine whether the current simulation step is a last simulation step when the current rigid body is the last rigid body, and finish the calculation when the current simulation step is the last simulation step, or take the next simulation step as the current simulation step and return to perform the using of the corresponding algorithm engine to calculate current motion and dynamic parameters of the first rigid body when the current simulation step is not the last simulation step; and take a next rigid body as the current rigid body when the current rigid body is not the last rigid body, and use the corresponding algorithm engine and/or the corresponding collision logic to calculate current motion and dynamic parameters of the current rigid body according to motion and dynamic parameters of a previous rigid body, and then return to perform the determining of whether the current rigid body is the last rigid body in the joint chain.

12. The system of claim 7, wherein the multiple subsystems comprise at least one of the following subsystems:

a conventional joint subsystem comprising a fixed joint, a hinge joint, a sliding joint, a cylindrical joint, a screw joint, a point on curve joint, a ball joint and a planar joint, wherein three options of solution parameters of dynamics, kinematics and articulation are set for each joint in the conventional joint subsystem;

an open-loop subsystem with one end connected to a ground, which comprises at least one rigid body and at least one joint, wherein three options of solution parameters of dynamics, kinematics and articulation are set for each joint in the open-loop subsystem;

a closed-loop subsystem with two ends connected to the ground, which comprises rigid bodies and joints, wherein three options of solution parameters of dynamics, kinematics, and articulation are set for each joint of the joints in the closed-loop subsystem;

a point on a curve joint chain subsystem comprising a master rigid body controlled by 1 to 3 point kinematics joints on the curve and at least one slave rigid body following the motion of the master rigid body, wherein an option of kinematics solution parameter is set for each kinematics joint of the 1 to 3 point kinematics joints on the curve;

a coupling transport subsystem comprising a gear, a rack and pinion, a three joint coupler, a pulley and belt, and a mechanical cam, wherein three options of solution parameters of dynamics, kinematics, and articulation are set for each joint in the coupling transport subsystem;

a driving subsystem comprising position control, speed control, inverse kinematics control, gesture control, and transport surface, wherein three options of solution parameters of dynamics, kinematics, and articulation are set for each joint in the driving subsystem;

a hydraulic and pneumatic subsystem comprising force and/or torque control, hydraulic cylinder, hydraulic valve, pneumatic cylinder, and pneumatic valve, wherein an option of dynamic solution parameter is set for each joint in the hydraulic and pneumatic subsystem; and a dynamics joint subsystem comprising angular spring joint, linear spring joint, angular limit joint, linear limit joint, breaking constraint, and spring damper, wherein an option of dynamic solution parameter is set for each joint in the dynamics joint subsystem.

13. A system for digital plant system model creation and simulation, the system comprising:

at least one memory configured to store a computer program; and at least one processor configured to call the computer program stored in the at least one memory to:

receive a digital model created by a user based on a modeling library, wherein, in the modeling library, a digital plant system is divided into multiple subsystems, and motion joints in each subsystem of the multiple subsystems are set with at least one option of at least one solution parameter of dynamics, kinematics, and articulation;

analyze the digital model to obtain an analytical model with an execution order, wherein the analyzing of the digital model comprises, for each motion joint in the digital model, associating a corresponding algorithm engine in a simulation engine with the respective motion joint according to a solution parameter of the respective motion joint, and wherein the simulation engine comprises a kinematics algorithm engine, a dynamics algorithm engine, and an articulation algorithm engine; and solve the analytical model according to the execution order of the analytical model and performing a simulation according to a solution result, wherein the solving of the analytical model comprises using the corresponding algorithm engine to solve the respective motion joint associated with the corresponding algorithm engine.

* * * * *